US012769236B2

(12) United States Patent
Itoh

(10) Patent No.: US 12,769,236 B2
(45) Date of Patent: Oct. 20, 2026

(54) IMAGE FORMING APPARATUS

(71) Applicant: SHARP KABUSHIKI KAISHA, Sakai City (JP)

(72) Inventor: Kenji Itoh, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/217,076

(22) Filed: May 23, 2025

(65) Prior Publication Data

US 2025/0390045 A1 Dec. 25, 2025

(30) Foreign Application Priority Data

Jun. 20, 2024 (JP) ................................ 2024-099729

(51) Int. Cl.

| | |
|---|---|
| ***G03G 15/00*** | (2006.01) |
| ***G03G 15/08*** | (2006.01) |
| ***G03G 21/14*** | (2006.01) |
| ***G03G 21/16*** | (2006.01) |

(Continued)

(52) U.S. Cl.

CPC ..... *G03G 15/5012* (2013.01); *G03G 15/0865* (2013.01); *G03G 15/5016* (2013.01); *G03G 15/502* (2013.01); *G03G 15/55* (2013.01); *G03G 15/553* (2013.01); *G03G 15/556* (2013.01); *G03G 15/70* (2013.01); *G03G 21/14* (2013.01); *G03G 21/1633* (2013.01);

(Continued)

(58) Field of Classification Search

CPC ........... G03G 15/5012; G03G 15/0865; G03G 15/502; G03G 15/5016; G03G 15/55; G03G 15/553; G03G 15/556; G03G 15/70; G03G 21/14; G03G 21/1633; H04N 1/00413; H04N 1/00477; H04N 1/4413; H04N 2201/0094

See application file for complete search history.

(56) References Cited

U.S. PATENT DOCUMENTS

| | | | | |
|---|---|---|---|---|
| 5,710,956 | A | 1/1998 | Kurohata et al. | |
| 2004/0009003 | A1 * | 1/2004 | Kim ..................... | G03G 15/502 399/81 |
| 2017/0094121 | A1 * | 3/2017 | Mizuno ................ | H04N 1/4433 |

(Continued)

FOREIGN PATENT DOCUMENTS

| | | |
|---|---|---|
| JP | H08-87213 A | 4/1996 |
| JP | 2021-189953 A | 12/2021 |

*Primary Examiner* — Joseph S Wong

(74) *Attorney, Agent, or Firm* — ScienBiziP, P.C.

(57) ABSTRACT

An image forming apparatus including: a main body including an image former; a display that displays various setting screens; an operation acceptor that receives an operation from a user; a storage that stores therein values set by the user in initial setup and a sequence of processing related to predetermined initial operations; and one or more controllers that control the image former, the display, the operation acceptor, and the storage, wherein in a case where the initial operations are carried out in parallel with the initial setup while the display is displaying a screen for the initial setup, the controllers cause, upon determining that an issue that interrupts a predetermined initial operation among the initial operations has occurred, the display to display a screen indicating the issue that interrupts the predetermined initial operation with priority over the screen for the initial setup.

7 Claims, 11 Drawing Sheets

(51) Int. Cl.
*H04N 1/00* (2006.01)
*H04N 1/44* (2006.01)

(52) U.S. Cl.
CPC ..... *H04N 1/00413* (2013.01); *H04N 1/00477* (2013.01); *H04N 1/4413* (2013.01); *H04N 2201/0094* (2013.01)

(56) References Cited

U.S. PATENT DOCUMENTS

2018/0115675 A1* 4/2018 Ikeda .................... H04N 1/4406
2021/0382983 A1 12/2021 Ogasawara
2023/0351008 A1 11/2023 Ogasawara

* cited by examiner

NOTIFICATION SCREEN IN CASE WHERE PRIORITY IS "HIGH"

NOTIFICATION SCREEN IN CASE WHERE PRIORITY IS "LOW"

NOTIFICATION SCREEN IN CASE WHERE PRIORITY IS "LOW"

IMAGE FORMING APPARATUS

BACKGROUND OF THE INVENTION

Field of the Invention

The present disclosure relates to an image forming apparatus.

Description of the Background Art

In recent years, the need to enhance security has been increasing even for image forming apparatuses such as multifunctional peripherals. One way to enhance the security of an image forming apparatus is to require a change to a setting such as an administrator password at the time of initial startup after installation of the image forming apparatus.

In relation to this matter, a conventional information processing device that has been proposed includes a log presenter that presents operation history information when an administrator password is changed, so that the administrator or other users of the information processing device can determine whether or not any unauthorized use has occurred and what has been done as the unauthorized use, and consider appropriate countermeasures by retrospectively checking usage of the information processing device during the period between the first startup of the information processing device and the change of the initially set administrator password.

Some known image forming apparatuses go through toner replenishment, initialization operations of functional components, and image quality adjustment at the time of initial startup.

In relation to initialization operations of such image forming apparatuses, an image forming apparatus according to conventional art that has been proposed includes: a sequence memory for storing a sequence of initialization processing to be conducted only when the apparatus is installed as a new product; and a sequence executer for carrying out the initialization processing in accordance with the sequence when the apparatus is installed as a new product. This configuration allows the initialization processing, which is necessary when the apparatus is installed as a new product, to be automatically executed, achieving a reduction in the burden of initialization work on a user and prevention of errors in the initialization work.

Some settings such as an administrator password need to be configured (hereinafter, also referred to as "initial setup") and some operations such as a toner replenishment operation (hereinafter, also referred to as "initial operations") need to be executed when an image forming apparatus is installed for the first time. However, starting the initial setup only after completing the initial operations prolongs the time required before the apparatus is ready for use by the user.

However, executing the initial operations at the same time as the initial setup may result in a different problem. That is, in a case where a front door of the image forming apparatus opens during the execution of an initial operation of the image forming apparatus and the initial operation is interrupted, the user may fail to notice that the front door needs to be closed, due to a screen for the initial setup being displayed on an operation panel. In such a case, the image forming apparatus performs the initial operation only after the initial setup has been completed and the user has closed the front door, which is inefficient and requires more time than necessary.

The present disclosure has been made in view of the problems described above, and an object thereof is to provide an image forming apparatus that prevents, in a case where initial setup and initial operations are carried out simultaneously, the initial operations from taking longer than necessary even if a certain initial operation is temporarily interrupted.

SUMMARY OF THE INVENTION

The present disclosure provides an image forming apparatus including: a main body including an image former; a display that displays various setting screens; an operation acceptor that receives an operation from a user; a storage that stores therein values set by the user in initial setup and a sequence of processing related to predetermined initial operations; and one or more controllers that control the image former, the display, the operation acceptor, and the storage, wherein in a case where the initial operations are carried out in parallel with the initial setup while the display is displaying a screen for the initial setup, the controllers cause, upon determining that an issue that interrupts a predetermined initial operation among the initial operations has occurred, the display to display a screen indicating the issue that interrupts the predetermined initial operation with priority over the screen for the initial setup.

According to the present disclosure, in a case where initial setup and initial operations are carried out simultaneously, the controllers cause, upon determining that an issue that interrupts a predetermined initial operation has occurred, the display to display a screen indicating the issue that interrupts the initial operation with priority over the screen for the initial setup. Thus, it is possible to achieve an image forming apparatus that prevents the initial operations from taking longer than necessary even if a certain initial operation is temporarily interrupted.

In the present disclosure, an "image forming apparatus" refers to an apparatus that forms and outputs an image, such as a copier that has a copier function (copy function) including a printer employing an electrophotographic method for image formation using toner, or a multifunctional peripheral (MFP) that has various functions including the copier function.

The following describes preferred embodiments of the present disclosure.

In the image forming apparatus according to the present disclosure, the controllers may cause the display to display the screen for the initial setup with priority, provided that the predetermined initial operation has been completed.

According to this configuration, in a case where initial setup and initial operations are carried out simultaneously, the controllers cause the display to display the screen for the initial setup with priority even if an issue that interrupts a predetermined initial operation has occurred, provided that the predetermined initial operation has been completed. Thus, it is possible to achieve an image forming apparatus that prevents the initial operations from taking longer than necessary even if a certain initial operation is temporarily interrupted.

In the image forming apparatus according to the present disclosure, in a case where a restart of the image forming apparatus is required after completion of the initial setup, the controllers may put the restart on hold until the predetermined initial operation is completed if the predetermined initial operation has not been completed.

According to this configuration, in a case where initial setup and initial operations are carried out simultaneously, and a restart of the image forming apparatus is required after completion of the initial setup, the controllers put the restart on hold until the predetermined initial operation is completed if the predetermined initial operation has not been completed. Thus, it is possible to achieve an image forming apparatus that prevents the initial operations from taking longer than necessary.

In the image forming apparatus according to the present disclosure, the predetermined initial operation may be a predetermined image formation-related operation including toner replenishment and image quality adjustment.

According to this configuration, in a case where initial setup and initial operations are carried out simultaneously, the controllers prioritize notifying the user of an issue that interrupts a time-consuming image formation-related operation such as toner replenishment and image quality adjustment among the initial operations. Thus, it is possible to achieve an image forming apparatus that prevents the initial operations from taking longer than necessary even if a certain initial operation is temporarily interrupted.

In the image forming apparatus according to the present disclosure, the main body may include a toner cartridge mount in which a toner cartridge is mounted and a toner cartridge mounting detector that detects mounting of the toner cartridge, and the issue that interrupts the predetermined initial operation may be the toner cartridge being yet to be mounted.

According to this configuration, in a case where initial setup and initial operations are carried out simultaneously, the controllers prioritize notifying the user that the toner cartridge has not been mounted as an issue that interrupts the predetermined initial operation. Thus, it is possible to achieve an image forming apparatus that prevents the initial operations from taking longer than necessary even if a certain initial operation is temporarily interrupted.

In the image forming apparatus according to the present disclosure, the main body may include a door provided at a predetermined position and a door open/close detector that detects whether the door is open or closed, and the issue that interrupts the predetermined initial operation may be the door being open.

According to this configuration, in a case where initial setup and initial operations are carried out simultaneously, the controllers prioritize notifying the user that the predetermined door is open as an issue that interrupts the predetermined initial operation. Thus, it is possible to achieve an image forming apparatus that prevents the initial operations from taking longer than necessary even if a certain initial operation is temporarily interrupted.

In the image forming apparatus according to the present disclosure, the main body may include an error detector that detects a predetermined error, and the issue that interrupts the predetermined initial operation may be the predetermined error being detected.

According to this configuration, in a case where initial setup and initial operations are carried out simultaneously, the controllers prioritize notifying the user that the predetermined error has occurred as an issue that interrupts the predetermined initial operation. Thus, it is possible to achieve an image forming apparatus that prevents the initial operations from taking longer than necessary even if a certain initial operation is temporarily interrupted.

BRIEF DESCRIPTION OF THE DRAWINGS

FIG. 13A shows an example of a notification screen in a case where the priority is "high".

FIG. 13B shows an example of a notification screen in a case where the priority is "low".

FIG. 14A shows an example of a notification screen displayed in the form of an icon. FIG. 14B shows an example of a notification screen displayed in the form of a dialog upon the icon being touched.

DESCRIPTION OF THE PREFERRED EMBODIMENTS

The following describes the present disclosure in further detail with reference to the accompanying drawings.

The description given below are exemplary in all aspects, and are not intended to be construed as a basis of limiting the present disclosure.

Embodiment 1

Figure 1:
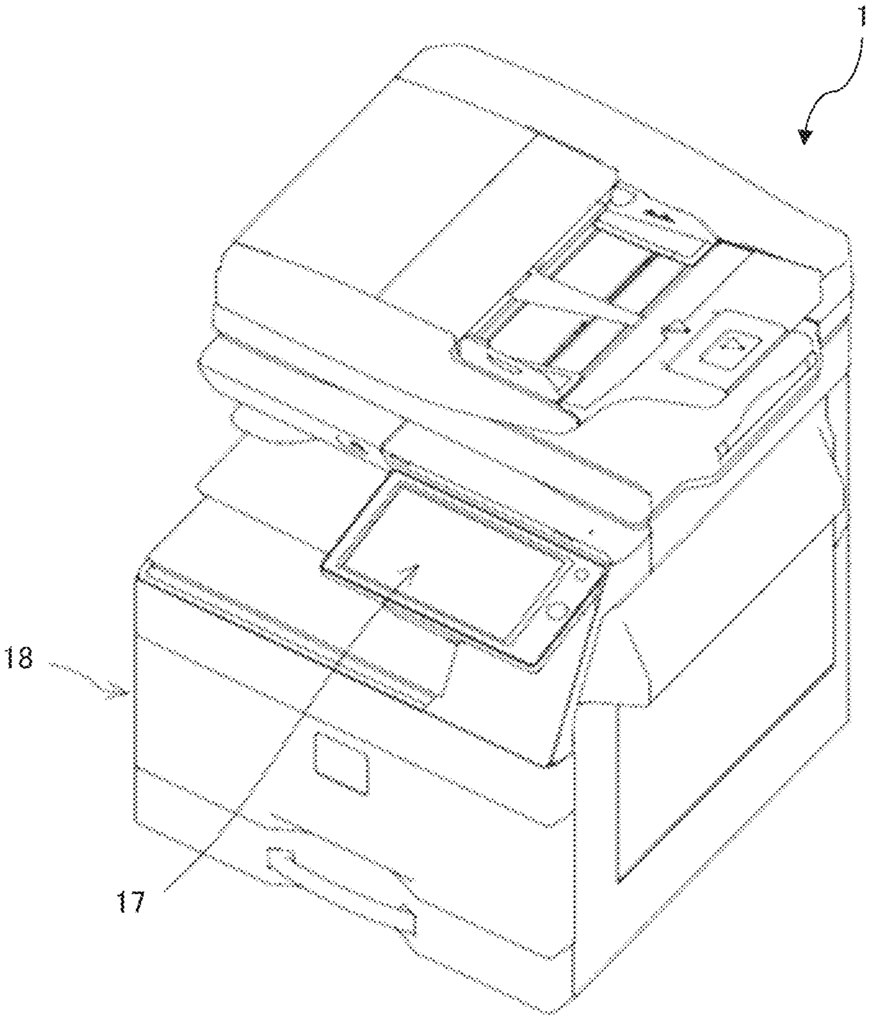
FIG. 1 is a perspective view of an exterior of a digital multifunctional peripheral according to Embodiment 1 of the present disclosure.
Figure 2:
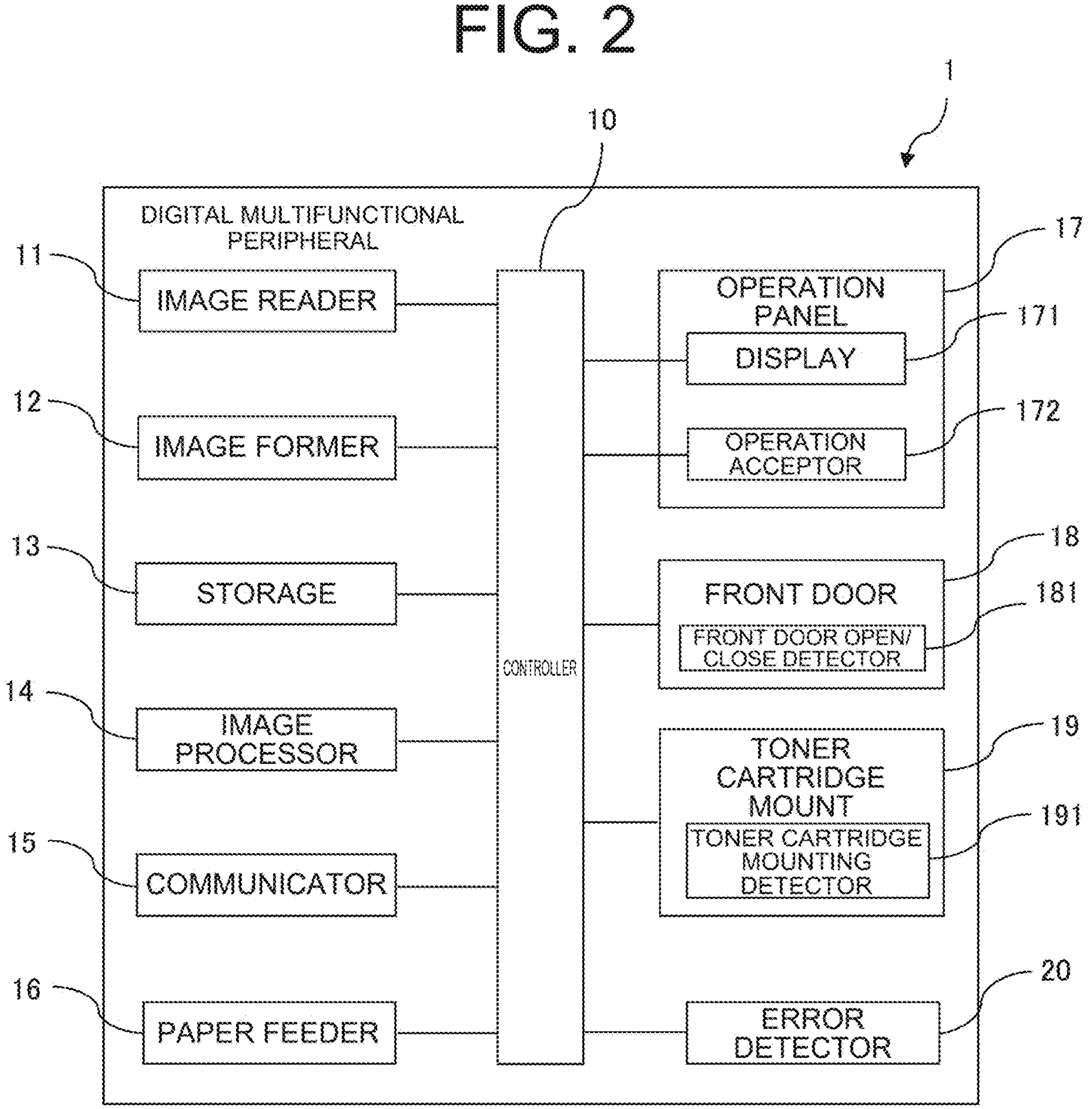
FIG. 2 is a block diagram illustrating a general configuration of the digital multifunctional peripheral shown in FIG. 1.

Based on FIGS. 1 and 2, the following describes an overview of a digital multifunctional peripheral 1, which is an example of an image forming apparatus, that includes an image forming apparatus according to the present disclosure.

FIG. 1 is a perspective view of an exterior of the digital multifunctional peripheral 1 according to Embodiment 1 of the present disclosure. FIG. 2 is a block diagram illustrating a general configuration of the digital multifunctional peripheral 1 shown in FIG. 1.

The digital multifunctional peripheral 1 is an apparatus that has a copier function, a scanner function, and a facsimile function, and digitally processes and outputs image data obtained by reading a document.

As shown in FIG. 1, the digital multifunctional peripheral 1 has an operation panel 17 at the top of a main body thereof and a front door 18 at the front of the main body.

Next, a general configuration of the digital multifunctional peripheral 1 will be described based on FIG. 2.

FIG. 2 is a block diagram illustrating a general configuration of the digital multifunctional peripheral 1 shown in FIG. 1.

As shown in FIG. 2, the digital multifunctional peripheral 1 includes a controller 10, an image reader 11, an image former 12, a storage 13, an image processor 14, a communicator 15, a paper feeder 16, the operation panel 17, the front door 18, a toner cartridge mount 19, and an error detector 20.

The following describes each component of the digital multifunctional peripheral 1.

The controller 10 performs comprehensive control of the digital multifunctional peripheral 1. The controller 10 includes, for example, at least one central processing unit (CPU), at least one random access memory (RAM), at least one read-only memory (ROM), and various interface circuits. The controller 10 also includes a hard disk drive (HDD), which is a nonvolatile storage device capable of retaining data even when power is cut off.

The controller 10 monitors and controls all loads, including detection by sensors, motors, clutches, and the operation panel 17, to control operation of the entire digital multifunctional peripheral 1.

The controller 10 also stores data inputted from the image reader 11 in the storage 13, retrieves data from the storage 13, and controls, for example, transmission instructions to the image processor 14, printing instructions to the image former 12, and copying.

The image reader 11 detects and reads a document placed on a document table or a document conveyed from a paper tray by operating, for example, a document scanner using a charge coupled device (CCD), and generates image data.

The image former 12 prints and outputs the image data generated by the image processor 14 onto a recording medium.

The image former 12 is a device that forms an electrostatic latent image by irradiating a surface of a photoreceptor drum in a charged state with laser light corresponding to image information in the form of a digital signal acquired by the image reader 11.

The storage 13 is an element or a storage medium that stores system programs necessary to implement various functions of the digital multifunctional peripheral 1 and control programs for the controller 10.

The storage 13 holds user data, temporarily stores image data such as read data and print data, and stores various setting values.

For example, semiconductor elements such as RAM and ROM, and storage media such as hard disks, flash memory, and SSDs may be used.

The programs and the data may be held in different devices. For example, the data may be held in an area of a hard disk drive, and the programs may be held in an area of flash memory.

The image processor 14 converts an image of a document read by the image reader 11 into an appropriate electrical signal and generates image data for image formation.

The image processor 14 also performs processing of the image data inputted from the image reader 11, such as scaling up or scaling down, to make the image data suitable for output in accordance with a command from a display 171.

The communicator 15 communicates with computers, portable information terminals, external information processing devices, facsimile machines, and the like via a network such as a wired or wireless LAN, and transmits and receives various types of information such as e-mails and faxes to and from these external communication devices.

The paper feeder 16 conveys recording media stored in a manual feed tray and paper cassettes to the image former 12.

The operation panel 17 is a unit equipped with a liquid crystal display, and includes the display 171 and an operation acceptor 172.

The display 171 displays various types of information and receives commands from a user through a touch panel function.

The display 171 includes, for example, a CRT display, a liquid crystal display, or an EL display. The display 171 is a display device, such as a monitor or a line display, that allows an operating system or application software to display electronic data, such as processing status. The controller 10 displays the operation and the condition of the digital multifunctional peripheral 1 through the display 171.

The operation acceptor 172 receives commands from the user through buttons displayed on the display 171.

The operation acceptor 172 may include physical keys such as a power button and number buttons.

The front door 18 is a cover for replacing toner and other items, and is openable and closable. It should be noted that the front door 18 may be provided with a lock so that only an administrator can open the front door and other users cannot open the front door.

The front door 18 includes a front door open/close detector 181 that detects whether or not the front door 18 is open.

The toner cartridge mount 19 is where a toner cartridge is mounted.

The toner cartridge mount 19 includes a toner cartridge mounting detector 191.

The toner cartridge mounting detector 191 detects whether or not a toner cartridge is mounted in the toner cartridge mount 19.

The error detector 20 detects various predetermined errors such as system errors.

Initial Setup Processing Performed by Digital Multifunctional Peripheral 1

Based on FIGS. 3 to 7, the following describes an example of initial setup processing that is performed by the digital multifunctional peripheral 1 according to Embodiment 1 of the present disclosure.

Figure 3:
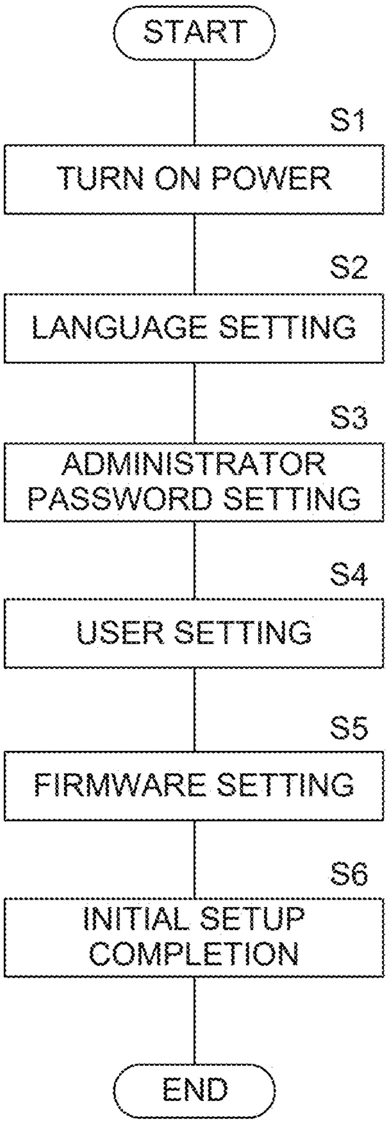
FIG. 3 is a flowchart showing an example of initial setup processing that is performed by the digital multifunctional peripheral shown in FIG. 1.

FIG. 3 is a flowchart showing an example of the initial setup processing that is performed by the digital multifunctional peripheral 1 shown in FIG. 1.

When the user unboxes the digital multifunctional peripheral 1, mounts toner and other items, and then turns on the power with the front door 18 closed, processing such as toner replenishment and image quality adjustment is performed at the time of initial startup. The user therefore needs to wait for such processing to be completed.

In order to allow settings of information from the communicator 15 and various other settings to be configured separately based on user and administrator privileges, it is necessary to set an administrator password and register users at the time of initial startup, as shown in FIG. 3.

In Step S1 in FIG. 3, a user turns on the power for the first time after installation of the digital multifunctional peripheral 1 (Step S1). Then, in Step S2, the controller 10 of the digital multifunctional peripheral 1 starts up a system and causes the display 171 to display a language setting screen (Step S2).

Figure 4:
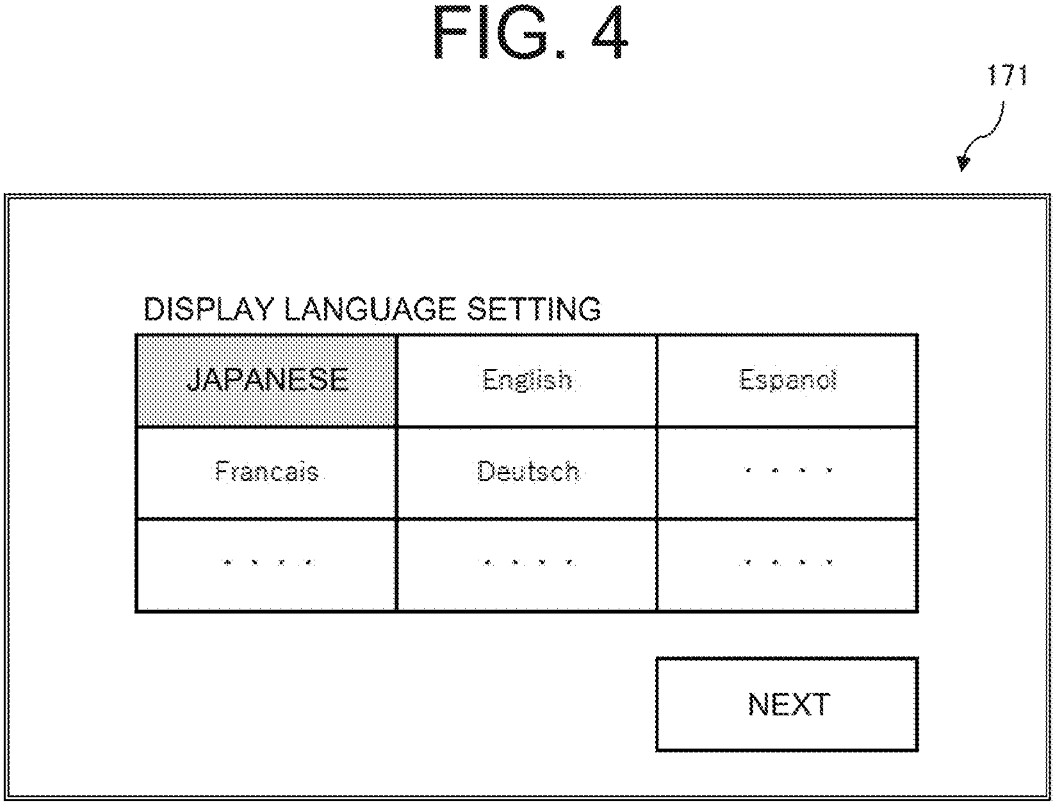
FIG. 4 is an explanatory diagram showing an example of a display language setting screen displayed on a display of the digital multifunctional peripheral shown in FIG. 1.

FIG. 4 is an explanatory diagram showing an example of a display language setting screen displayed on the display 171 of the digital multifunctional peripheral 1 shown in FIG. 1.

As shown in FIG. 4, language names such as "Japanese", "English", "Espanol", "Francais", and "Deutsch" are displayed as display language settings.

In the example shown in FIG. 4, "Japanese" has been selected.

Once the operation acceptor 172 receives a language setting from the user, the controller 10 causes the display 171 to display setting screens in the set language.

In the example shown in FIG. 4, the user pressing a "Next" button causes a transition to a next setting screen.

Subsequently, in Step S3, the controller 10 causes the display 171 to display an administrator password setting screen (Step S3).

An administrator password may be used for various settings of the digital multifunctional peripheral 1 and for access from external devices via a network. It is therefore necessary to set the password at the time of the initial setup for enhanced security.

Figure 5:
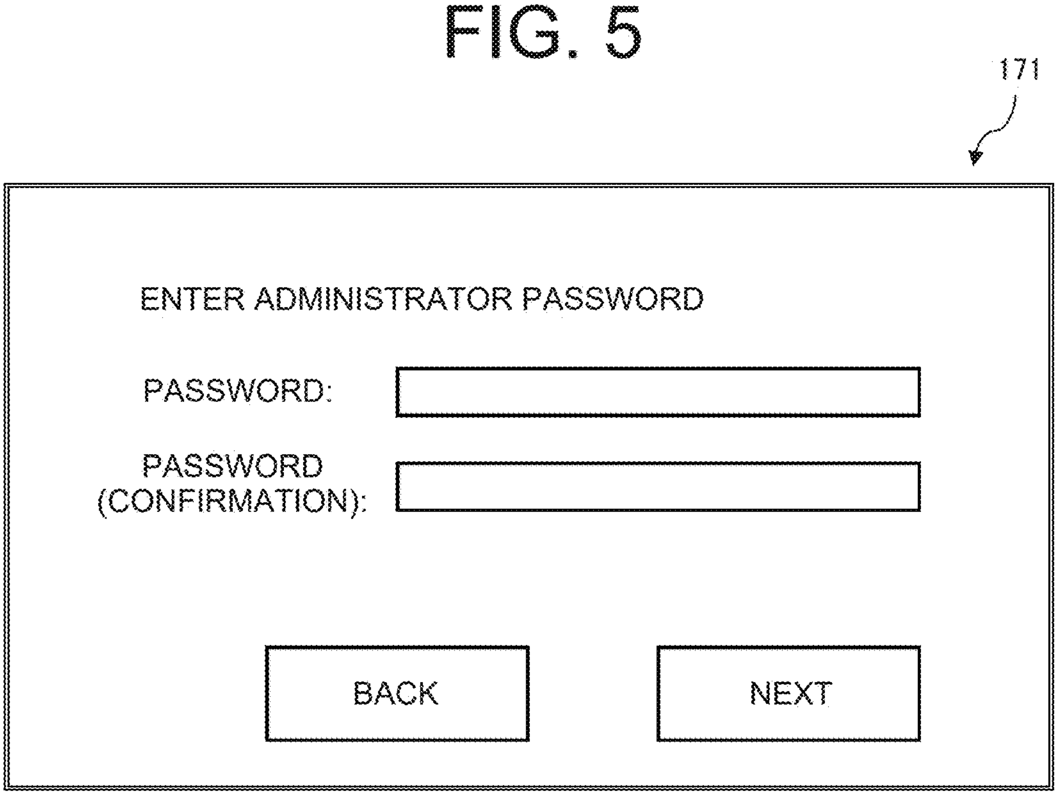
FIG. 5 is an explanatory diagram showing an example of an administrator password setting screen displayed on the display of the digital multifunctional peripheral shown in FIG. 1.

FIG. 5 is an explanatory diagram showing an example of the administrator password setting screen displayed on the display 171 of the digital multifunctional peripheral 1 shown in FIG. 1.

As shown in FIG. 5, the user designated as an administrator enters a password in "Password" and "Password (confirmation)" fields.

In the example shown in FIG. 5, the user pressing a "Back" button causes a transition to an immediately preceding setting screen.

The user pressing the "Next" button causes a transition to a next setting screen without setting a password.

Next, in Step S4, the controller 10 causes the display 171 to display a user-specific setting screen (Step S4).

As user-specific settings, the user's initial password and printing restrictions may be set.

Next, in Step S5, the controller 10 causes the display 171 to display a remote firmware update setting screen (Step S5).

The user can set, for example, whether to enable or disable remote firmware update on the remote firmware update setting screen.

Figure 6:
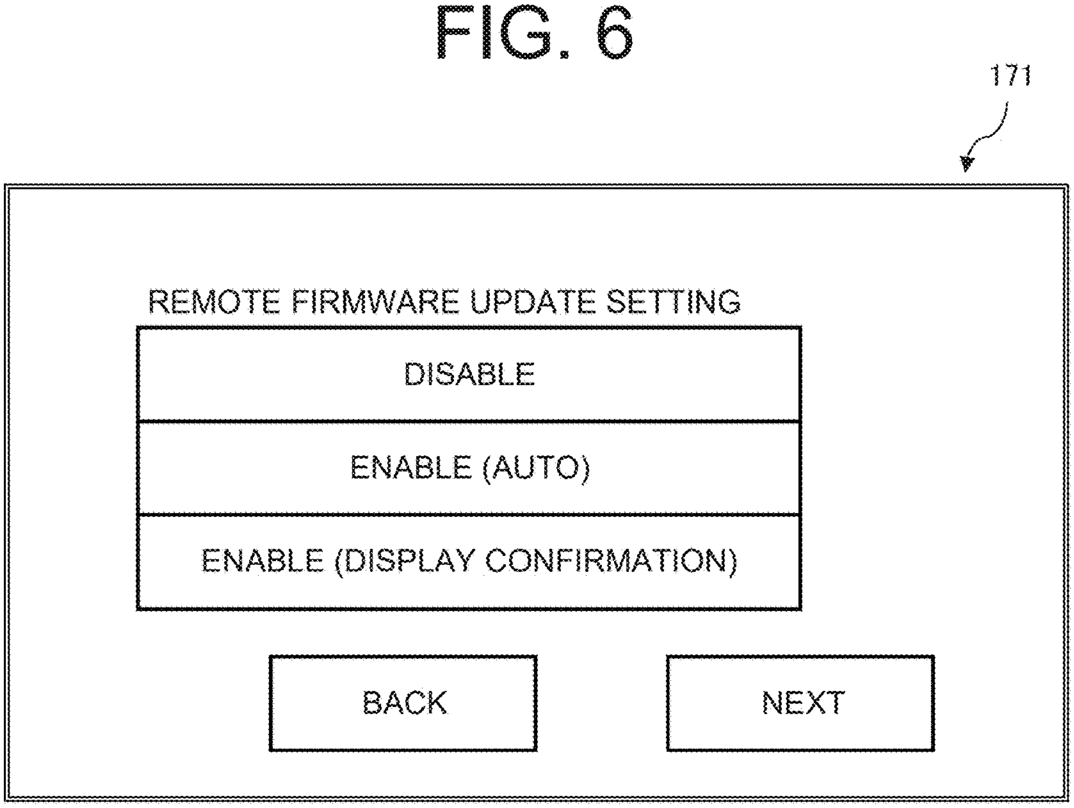
FIG. 6 is an explanatory diagram showing an example of a remote firmware update setting screen displayed on the display of the digital multifunctional peripheral shown in FIG. 1.

FIG. 6 is an explanatory diagram showing an example of the remote firmware update setting screen displayed on the display 171 of the digital multifunctional peripheral 1 shown in FIG. 1.

As shown in FIG. 6, the user selects one of "Disable", "Enable (auto)", or "Enable (display confirmation)" as a remote firmware update setting.

In a case where "Disable" is selected, remote firmware update is disabled.

In a case where "Enable (auto)" is selected, remote firmware update is performed automatically.

In a case where "Enable (display confirmation)" is selected, the controller 10 allows the user to choose whether or not to perform remote firmware update by displaying a confirmation screen in advance.

In the example shown in FIG. 6, the user pressing the "Back" button causes a transition to an immediately preceding setting screen.

The user pressing the "Next" button ends the initial setup.

Even if the user ends the initial setup by pressing the "Next" button without configuring some of the settings, the user can still change the settings by entering the administrator password, because the same setting items as those mentioned above are provided as system settings or other settings.

Next, in Step S6, the controller 10 restarts the system to apply the settings configured in the initial setup (Step S6).

It should be noted that FIG. 3 merely shows an example of the initial setup. The controller 10 may allow various other settings to be configured for installing the digital multifunctional peripheral 1, such as network settings, wireless LAN settings, and alert notification settings for the digital multifunctional peripheral 1.

Figure 7:
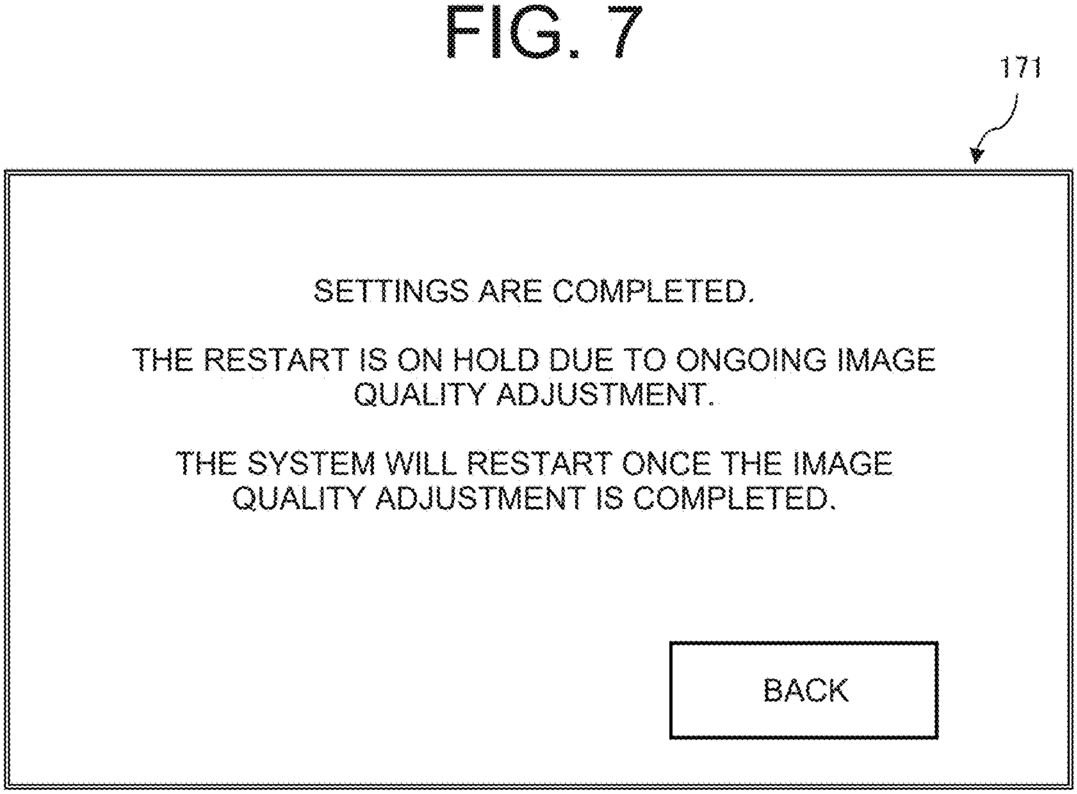
FIG. 7 is an explanatory diagram showing an example of an initial setup completion screen displayed on the display of the digital multifunctional peripheral shown in FIG. 1.

FIG. 7 is an explanatory diagram showing an example of an initial setup completion screen displayed on the display 171 of the digital multifunctional peripheral 1 shown in FIG. 1.

In some cases, the initial operations of the image former 12 are not completed when the system is restarted to apply the settings configured in the initial setup.

In such cases, if an initial operation is interrupted and the system is restarted, the initial operation of the digital multifunctional peripheral 1 needs to be performed again after the system has been restarted, which requires extra time.

To avoid such a problem, the controller 10 causes the display 171 to display a screen indicating that the restart is restricted as shown in FIG. 7 in a case where the initial setup of the digital multifunctional peripheral 1 has been completed but an initial operation of the image former 12 is still being executed.

In the example shown in FIG. 7, the following message is displayed: "Settings are completed. The restart is on hold due to ongoing image quality adjustment. The system will restart once the image quality adjustment is completed." In the example shown in FIG. 7, the user pressing the "Back" button causes a transition to an immediately preceding setting screen.

By displaying the screen described above, the controller 10 makes the user wait for the digital multifunctional peripheral 1 to complete the initial operation. The controller 10 then restarts the system automatically once the digital multifunctional peripheral 1 has completed the initial operation.

If the initial operation of the image former 12 had been completed when the initial setup of the digital multifunctional peripheral 1 has been completed, the controller 10 restarts the system without displaying the screen shown in FIG. 7.

Figure 8:
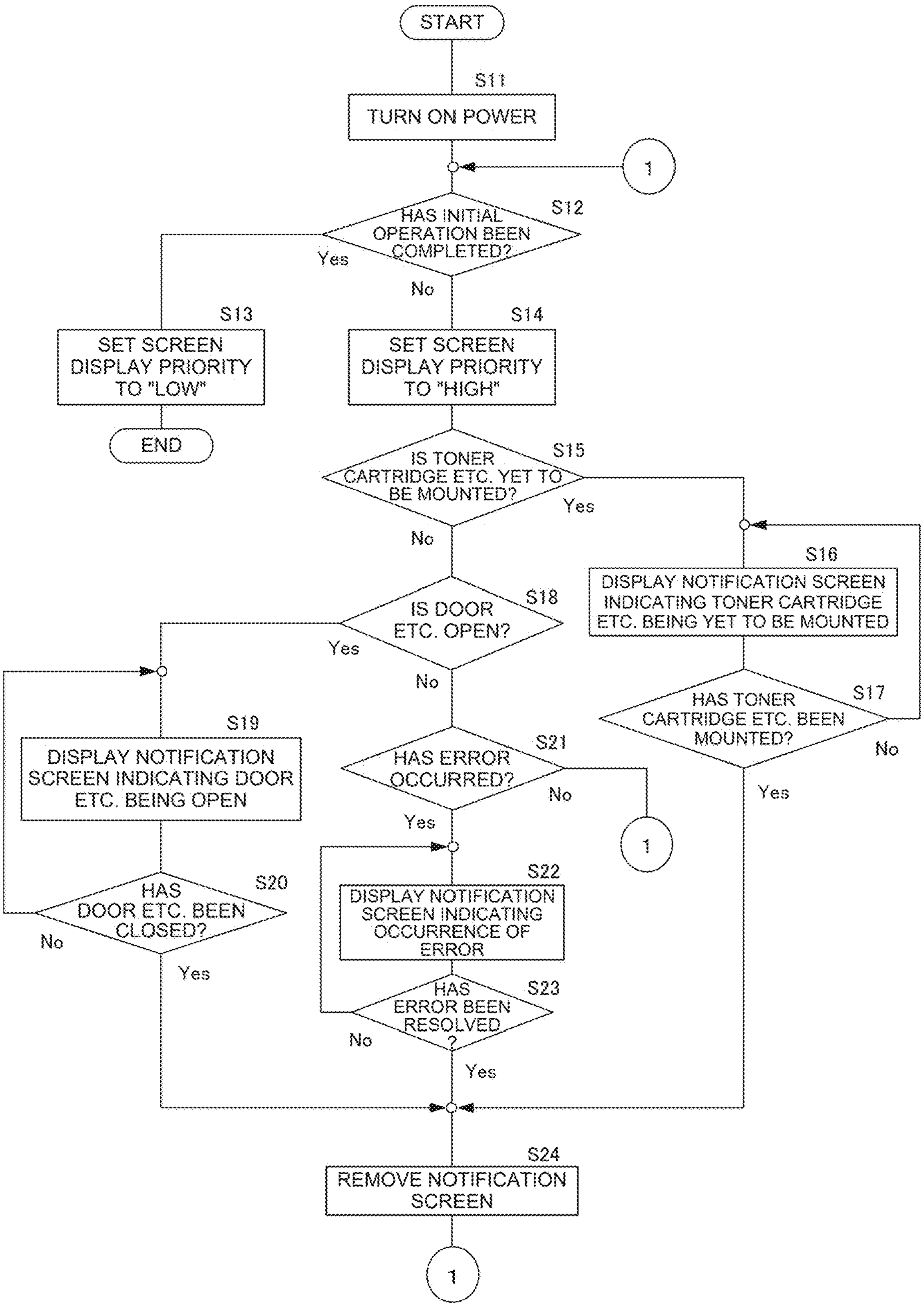
FIG. 8 is a flowchart showing an example of notification screen priority processing that is performed by the digital multifunctional peripheral shown in FIG. 1 during an initial operation.
Figure 9:
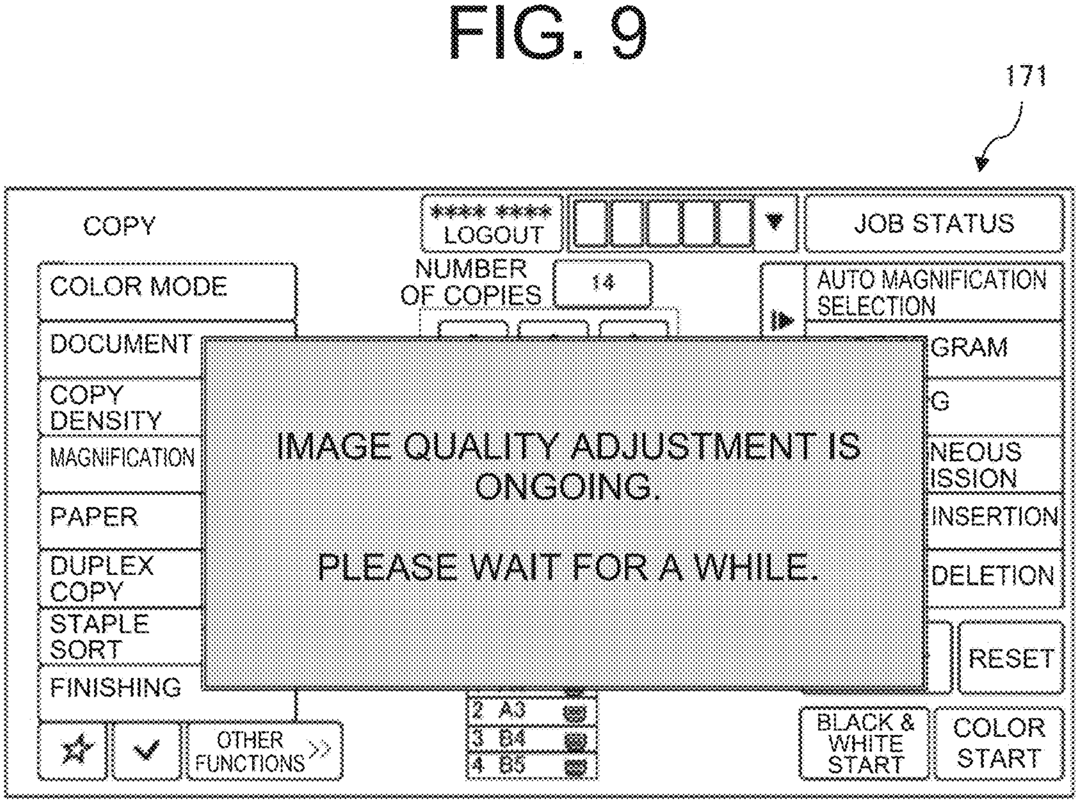
FIG. 9 is an explanatory diagram showing an example of an ongoing image quality adjustment notification screen displayed on the display of the digital multifunctional peripheral shown in FIG. 1 after completion of initial setup.
Figure 10:
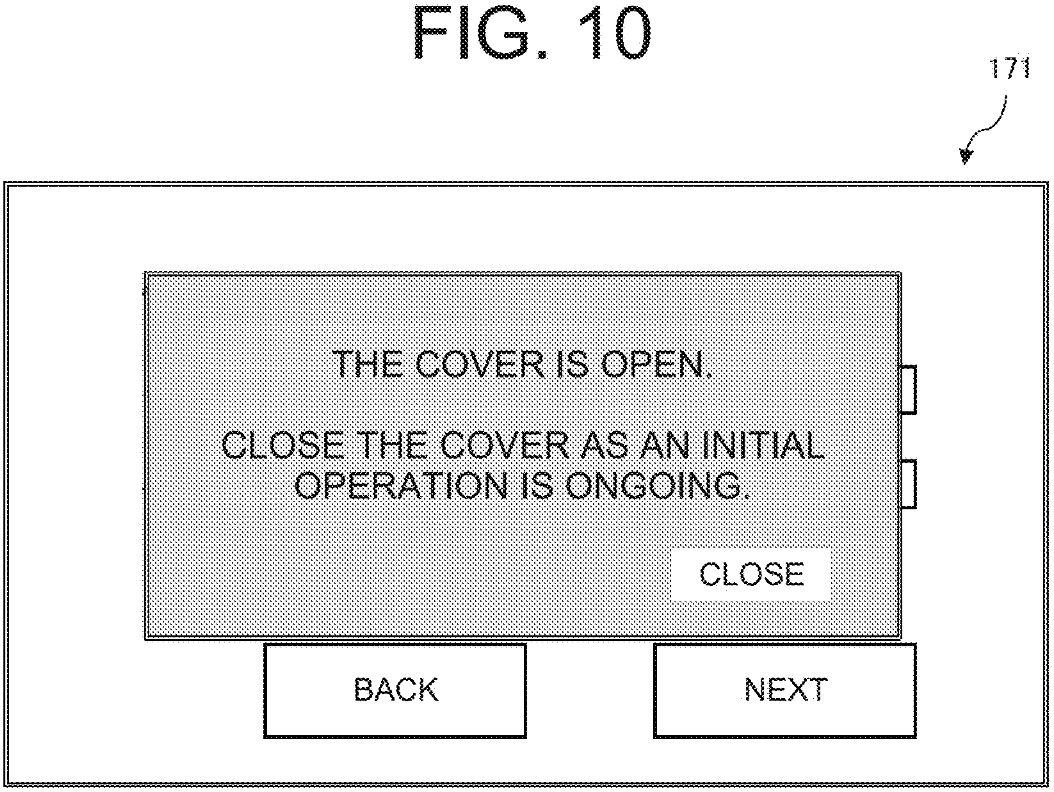
FIG. 10 is an explanatory diagram showing an example of a notification screen displayed on the display of the digital multifunctional peripheral shown in FIG. 1 in a case where a cover is opened during the initial setup.

Notification Screen Priority Processing Performed by Digital Multifunctional Peripheral 1 During Initial Operation Based on FIGS. 8 to 10, the following describes an example of notification screen priority processing that is performed by the digital multifunctional peripheral 1 according to Embodiment 1 of the present disclosure during an initial operation.

FIG. 8 is a flowchart showing an example of the notification screen priority processing that is performed by the digital multifunctional peripheral 1 shown in FIG. 1 during an initial operation.

Even when the administrator password settings and various other settings are being displayed on the screen of the display 171, the image former 12 can perform the toner replenishment operation and the image quality adjustment.

However, if the front door 18 is opened while the administrator is configuring a setting on the administrator password setting screen, the toner replenishment operation and the image quality adjustment may be interrupted.

In order to avoid such a situation, the processing shown in FIG. 8 is performed in Embodiment 1 of the present disclosure.

In Step S11 shown in FIG. 8, a user turns on the power for the first time after installation of the digital multifunctional peripheral 1 (Step S11). Subsequently, in Step S12, the controller 10 determines whether or not a predetermined initial operation has been completed (Step S12).

Upon determining that the initial operation has been completed (if the result of the determination in Step S12 is Yes), the controller 10 sets screen display priority to "low" in Step S13, and then ends the processing.

Thus, as long as the screen display priority is set to "low", the controller 10 does not cause the display 171 to display a predetermined notification screen (described below) for notifying the user that a predetermined component such as a toner cartridge is yet to be mounted, the front door 18 is open, or the digital multifunctional peripheral 1 is experiencing a system error while a screen for the initial setup is being displayed.

Upon determining that the initial operation has not been completed (if the result of the determination in Step S12 is No), the controller 10 sets the screen display priority to "high" in Step S14 (Step S14).

The controller 10 also displays an ongoing image quality adjustment notification screen if the initial setup has already been completed.

FIG. 9 is an explanatory diagram showing an example of the ongoing image quality adjustment notification screen displayed on the display 171 of the digital multifunctional peripheral 1 shown in FIG. 1 after completion of the initial setup.

In the example shown in FIG. 9, a notification screen notifying the user of the following is displayed on the display 171 in the form of a pop-up: "Image quality adjustment is ongoing. Please wait for a while."

Next, in Step S15, the controller 10 determines whether or not a predetermined component such as a toner cartridge is yet to be mounted in the main body of the digital multifunctional peripheral 1 (Step S15).

Upon determining that the predetermined component such as a toner cartridge is yet to be mounted in the main body of the digital multifunctional peripheral 1 (if the result of the determination in Step S15 is Yes), the controller 10 advances to Step S16 and causes the display 171 to display a predetermined notification screen indicating that the predetermined component such as a toner cartridge is yet to be mounted in the main body of the digital multifunctional peripheral 1 (Step S16).

In a case where the ongoing image quality adjustment notification screen is being displayed on the display 171 after the completion of the initial setup, the notification screen indicating that the predetermined component such as a toner cartridge is yet to be mounted in the main body of the digital multifunctional peripheral 1 is given priority thereover and displayed.

Examples of methods for such priority display include a method in which the notification screen indicating that the predetermined component such as a toner cartridge is yet to be mounted is displayed in the form of a pop-up over another screen, or a method in which the notification screen indicating that the predetermined component such as a toner cartridge is yet to be mounted is displayed in the center in a large size while any other screens and notifications are displayed in a relatively small size.

Thereafter, in Step S17, the controller 10 determines whether or not the predetermined component such as a toner cartridge has been mounted in the main body of the digital multifunctional peripheral 1 (Step S17).

Upon determining that the predetermined component such as a toner cartridge has been mounted in the main body of the digital multifunctional peripheral 1 (if the result of the determination in Step S17 is Yes), the controller 10 advances to Step S24 and causes the display 171 to remove the notification screen indicating that the predetermined component such as a toner cartridge is yet to be mounted (Step S24), and then returns the processing to the determination in Step S12.

Upon determining that the predetermined component such as a toner cartridge has not been mounted in the main body of the digital multifunctional peripheral 1 (if the result of the determination in Step S17 is No), the controller 10 returns the processing to Step S16.

Upon determining in Step S15 that the predetermined component such as a toner cartridge is mounted in the main body of the digital multifunctional peripheral 1 (if the result of the determination in Step S15 is No), the controller 10 advances to Step S18 and determines whether or not a predetermined door or cover such as the front door 18 is open (Step S18).

Upon determining that the predetermined door or cover is open (if the result of the determination in Step S18 is Yes), the controller 10 advances to Step S19 and causes the display 171 to display a notification screen indicating that the predetermined door or cover is open (Step S19).

In a case where the ongoing image quality adjustment notification screen is being displayed on the display 171 after the completion of the initial setup, the notification screen indicating that the predetermined door or cover is open is given priority thereover and displayed.

FIG. 10 is an explanatory diagram showing an example of the notification screen displayed on the display 171 of the digital multifunctional peripheral 1 shown in FIG. 1 in a case where the cover is opened during the initial setup.

In the example shown in FIG. 10, a notification screen containing the following message is displayed on the display 171 in the form of a pop-up: "The cover is open. Close the cover as an initial operation is ongoing."

The user can temporarily remove the notification screen from the display 171 by pressing "Close" in a lower right area of the notification screen. However, after a certain period of time (for example, 1 minute), the same notification screen is displayed on the display 171 again, requiring the user to close the cover.

Thereafter, in Step S20 shown in FIG. 8, the controller 10 determines whether or not the predetermined door or cover has been closed (Step S20).

Upon determining that the predetermined door or cover has been closed (if the result of the determination in Step S20 is Yes), the controller 10 advances to Step S24 and causes the display 171 to remove the notification screen indicating that the predetermined door or cover is open (Step S24), and then returns the processing to the determination in Step S12.

Upon determining that the predetermined door or cover has not been closed (if the result of the determination in Step S20 is No), the controller 10 returns the processing to Step S19.

In Step S18, upon determining that the predetermined door or cover is not open (if the result of the determination in Step S18 is No), the controller 10 advances to Step S21 and determines whether or not a predetermined error such as a system error has occurred (Step S21).

Upon determining that the predetermined error has not occurred (if the result of the determination in Step S21 is No), the controller 10 returns the processing to the determination in Step S12.

Upon determining that the predetermined error has occurred (if the result of the determination in Step S21 is Yes), the controller 10 advances to Step S22 and causes the display 171 to display a notification screen indicating that the error has occurred (Step S22).

In a case where the ongoing image quality adjustment notification screen is being displayed on the display 171 after the completion of the initial setup, the notification screen indicating that the error has occurred is given priority thereover and displayed.

In a case where at least two of the following occur simultaneously, the controller 10 may display a notification screen on the display 171 in accordance with a predetermined order of priority: the predetermined component such as a toner cartridge is yet to be mounted in the main body of the digital multifunctional peripheral 1 (the result of the determination in Step S15 is Yes), the predetermined door or cover is open (the result of the determination in Step S18 is Yes), and the predetermined error has occurred (the result of the determination in Step S21 is Yes).

Thereafter, in Step S23, the controller 10 determines whether or not the error has been resolved (Step S23).

Upon determining that the error has been resolved (if the result of the determination in Step S23 is Yes), the controller 10 advances to Step S24 and causes the display 171 to remove the notification screen indicating the occurrence of the error (Step S24), and then returns the processing to the determination in Step S12.

Upon determining that the error has not been resolved (if the result of the determination in Step S23 is No), the controller 10 returns the processing to Step S22.

As described above, in a case where initial setup and initial operations are carried out simultaneously, the controller 10 causes, upon determining that an issue that interrupts a predetermined initial operation has occurred, the display 171 to display a screen indicating the issue that interrupts the initial operation with priority over a screen being displayed for the initial setup. Thus, it is possible to achieve a digital multifunctional peripheral 1 that prevents the initial operations from taking longer than necessary even if a certain initial operation is temporarily interrupted.

Embodiment 2

Notification Screen Display Processing Performed by Digital Multifunctional Peripheral 1 Upon Occurrence of Event Based on FIGS. 11 to 14B, the following describes an example of notification screen display processing that is performed by a digital multifunctional peripheral 1 according to Embodiment 2 of the present disclosure upon occurrence of an event.

The digital multifunctional peripheral 1 according to Embodiment 2 of the present disclosure has the same general configuration as the digital multifunctional peripheral 1 according to Embodiment 1 (FIGS. 1 and 2). Description thereof is therefore omitted.

Initial setup processing and setting screens to be displayed on the display 171 of the digital multifunctional peripheral 1 according to Embodiment 2 of the present disclosure are the same as those of Embodiment 1 (FIGS. 3 to 7). Description thereof is therefore omitted.

Figure 11:
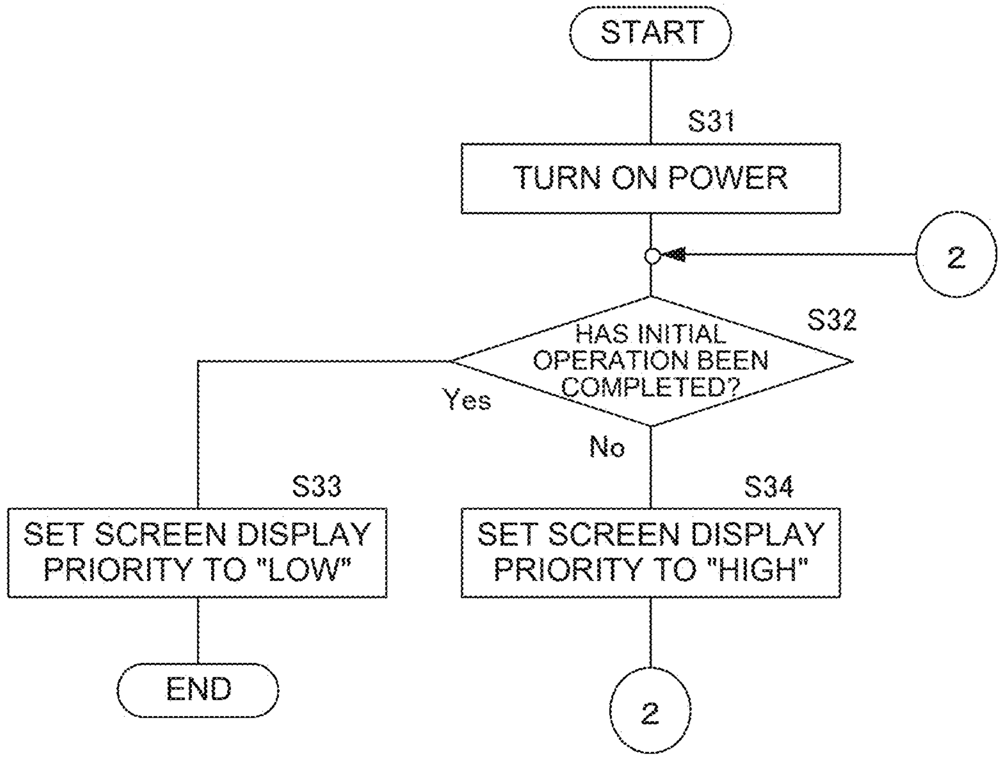
FIG. 11 is a flowchart showing an example of notification screen priority setting processing that is performed by a digital multifunctional peripheral according to Embodiment 2 of the present disclosure.

FIG. 11 is a flowchart showing an example of notification screen priority setting processing that is performed by the digital multifunctional peripheral 1 according to Embodiment 2 of the present disclosure.

In Step S31 shown in FIG. 11, a user turns on the power for the first time after installation of the digital multifunctional peripheral 1 (Step S31). Subsequently, in Step S32, the controller 10 determines whether or not a predetermined initial operation has been completed (Step S32).

Upon determining that the initial operation has been completed (if the result of the determination in Step S32 is Yes), the controller 10 sets screen display priority to "low" in Step S33, and then ends the processing.

Upon determining that the initial operation has not been completed (if the result of the determination in Step S32 is No), the controller 10 sets the screen display priority to "high" in Step S34 (Step S34).

Thereafter, the controller 10 returns the processing to the determination in Step S32.

Figure 12:
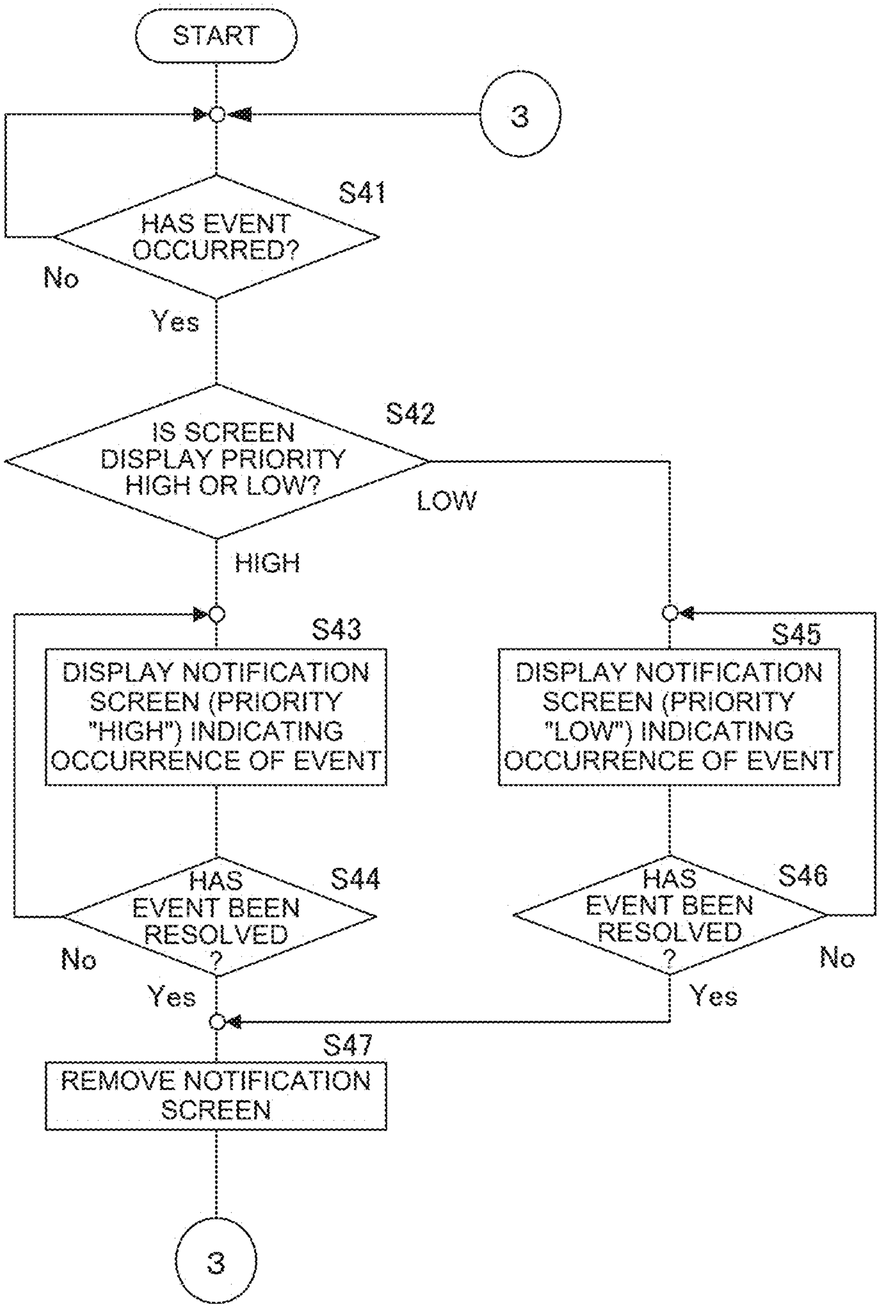
FIG. 12 is a flowchart showing an example of notification screen display processing that is performed by the digital multifunctional peripheral according to Embodiment 2 of the present disclosure upon occurrence of an event.

FIG. 12 is a flowchart showing an example of notification screen display processing that is performed by the digital multifunctional peripheral 1 according to Embodiment 2 of the present disclosure upon occurrence of an event.

Upon determining in Step S41 shown in FIG. 12 that a predetermined event has occurred (if the result of determination in Step S41 is Yes), the controller 10 advances to Step S42 and determines whether the screen display priority is "high" or "low" (Step S42).

Examples of predetermined events include the following that occurs while a screen for the initial setup is being displayed: a predetermined component such as a toner cartridge being yet to be mounted, the front door 18 being open, and the digital multifunctional peripheral 1 experiencing a system error.

Upon determining that the screen display priority is "high" (the result of the determination in Step S42 is "high"), the controller 10 advances to Step S43 and causes the display 171 to display a notification screen (priority "high") indicating the occurrence of the event (Step S43).

Figure 13A:
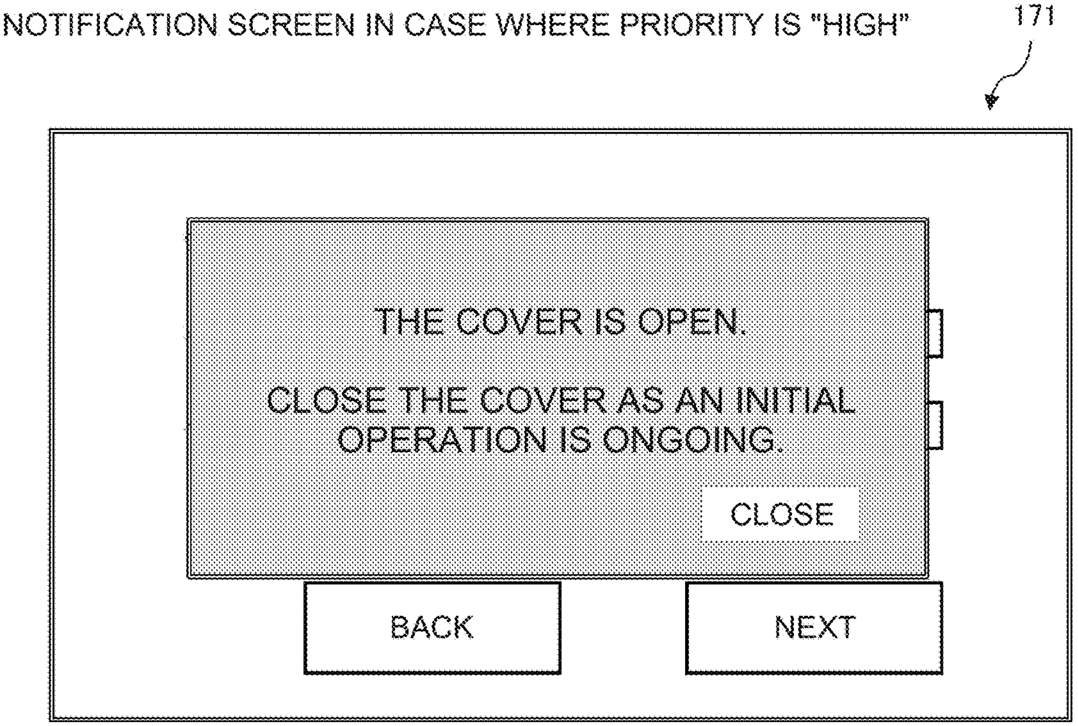
FIGS. 13A and 13B are each an explanatory diagram showing an example of a notification screen displayed on a display of the digital multifunctional peripheral according to Embodiment 2 of the present disclosure in a case where a cover is opened during initial setup.
Figure 13B:
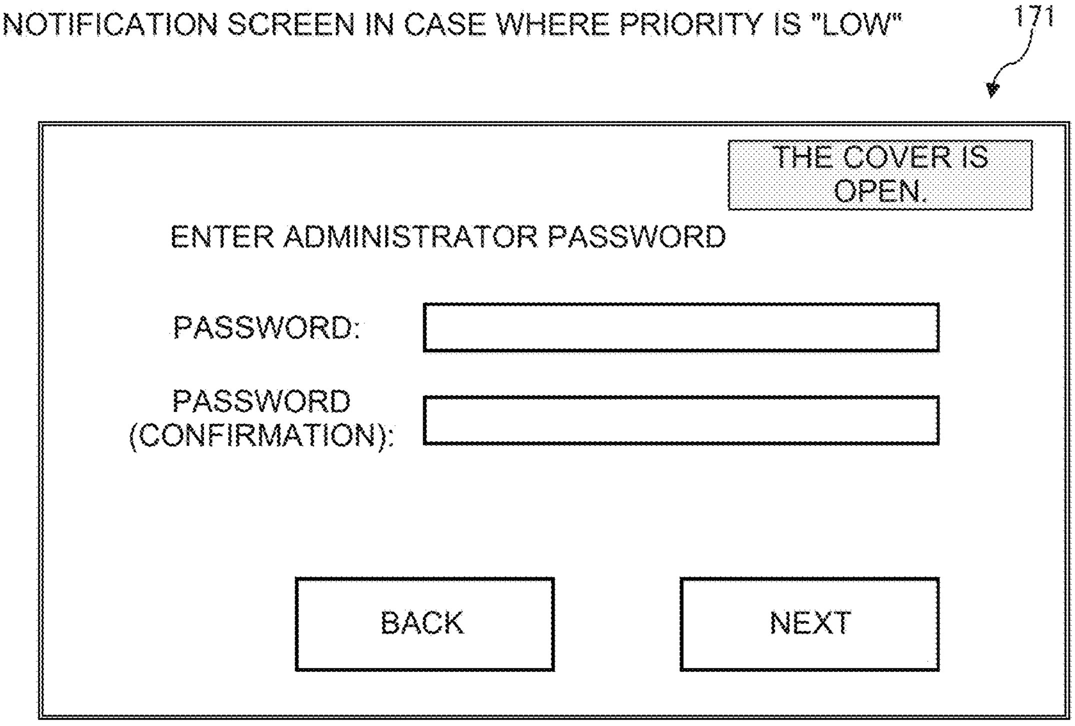

FIGS. 13A and 13B are each an explanatory diagram showing an example of a notification screen displayed on the display 171 of the digital multifunctional peripheral 1 according to Embodiment 2 of the present disclosure in a case where the cover is opened during the initial setup. FIG. 13A shows an example of a notification screen in a case where the priority is "high".

In the example shown in FIG. 13A, a notification screen containing the following message is displayed on the display 171 in the form of a pop-up: "The cover is open. Close the cover as an initial operation is ongoing."

As described above, upon determining that the priority is "high", the controller 10 displays the notification screen with priority over a screen being displayed for the initial setup (in the example shown in FIG. 13A, the administrator password setting screen), thereby promoting the user to resolve an event such as the cover being left open. The notification screen may be displayed on the display 171 in such a manner as to prevent the user from working on the screen for the initial setup.

Next, in Step S44 shown in FIG. 12, the controller 10 determines whether or not the event has been resolved (Step S44). Upon determining that the event has not been resolved (if the result of the determination in Step S44 is No), the controller 10 returns the processing to Step S43.

Upon determining that the event has been resolved (if the result of the determination in Step S44 is Yes), the controller 10 advances to Step S47 and causes the display 171 to remove the notification screen (priority "high") indicating the occurrence of the event (Step S47), and then returns the processing to the determination in Step S41.

Upon determining that the screen display priority is "low" (if the result of the determination in Step S42 is "low"), the controller 10 advances to Step S45 and causes the display 171 to display a notification screen (priority "low") indicating the occurrence of the event (Step S45).

FIG. 13B shows an example of a notification screen in a case where the priority is "low". In the example shown in FIG. 13B, a small notification screen containing the following message is displayed in an upper right area of the display 171: "The cover is open."

As described above, in a case where the priority is "low", the controller 10 displays the notification screen in a compact and unobtrusive manner so that the notification screen does not interfere with work on the screen for the initial setup.

Modification Example

Figure 14A:
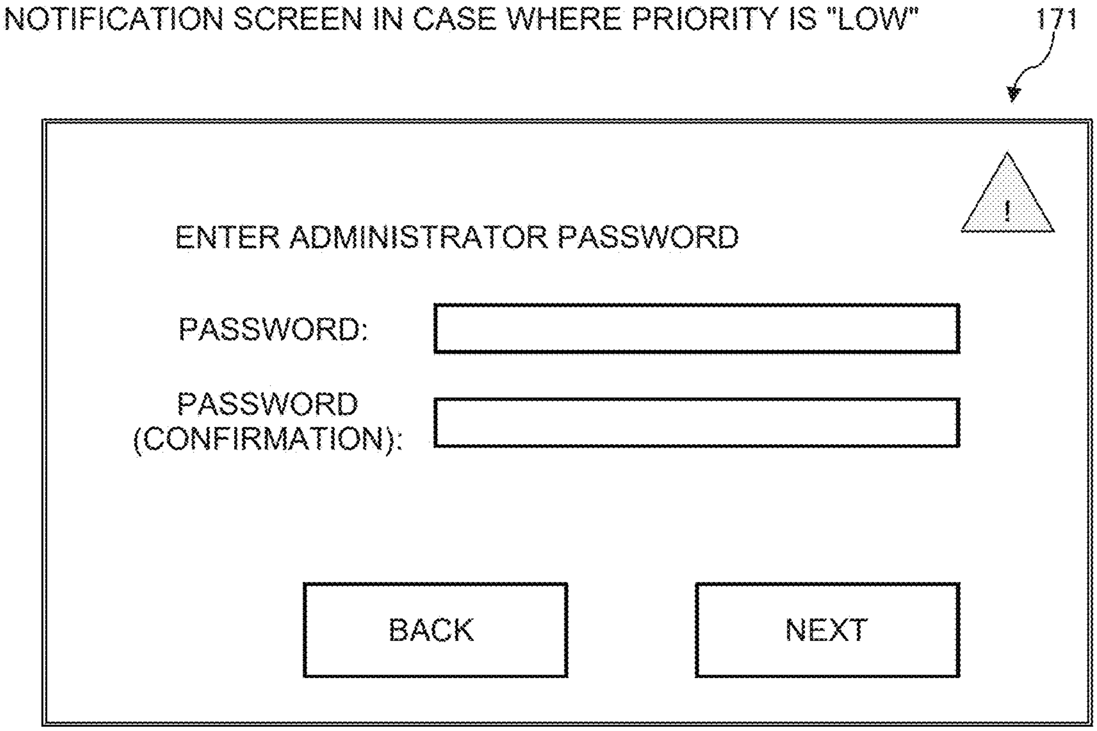
FIGS. 14A and 14B are each an explanatory diagram showing another example of a notification screen displayed on the display of the digital multifunctional peripheral according to Embodiment 2 of the present disclosure in a case where the priority is set to "low" and the cover is opened during the initial setup.
Figure 14B:
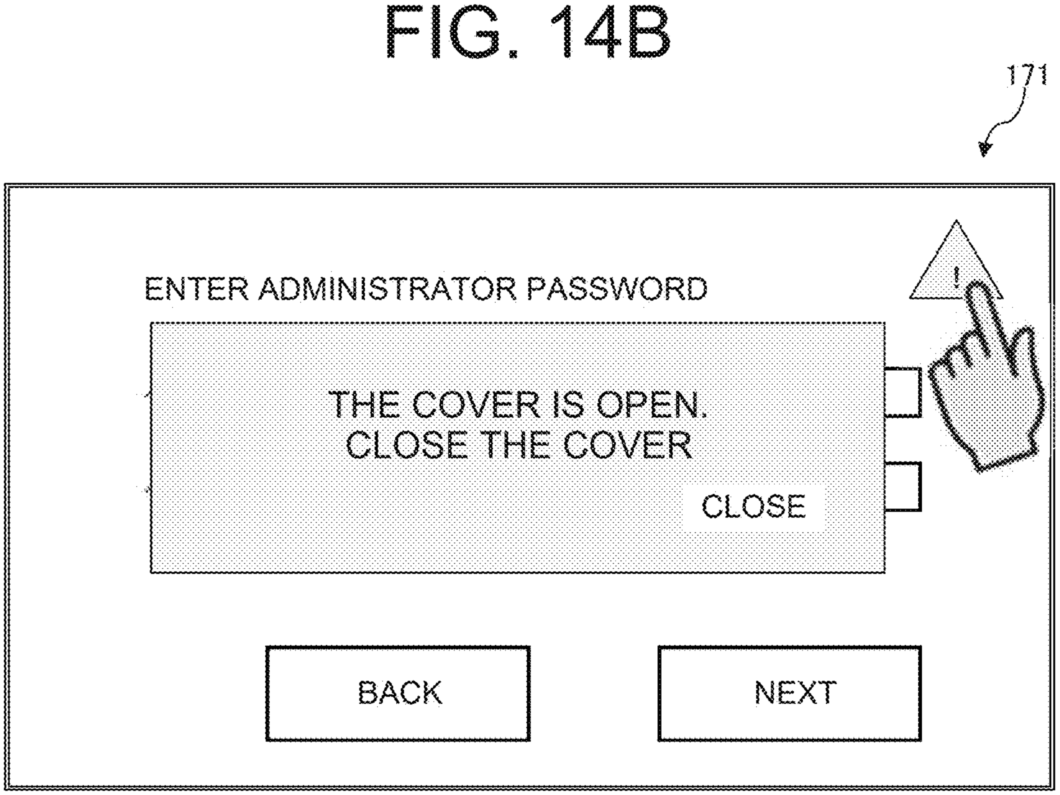

FIGS. 14A and 14B are each an explanatory diagram showing another example of a notification screen displayed on the display 171 of the digital multifunctional peripheral 1 according to Embodiment 2 of the present disclosure in a case where the priority is "low" and the cover is opened during the initial setup. FIG. 14A shows an example of a notification screen displayed in the form of an icon.

Thus, in a case where the priority is "low", the controller 10 may display a small icon in an unobtrusive manner so that the icon does not interfere with work on the screen for the initial setup.

FIG. 14B shows an example of a notification screen displayed in the form of a dialog upon the icon being touched.

As shown in FIG. 14B, upon the user touching the icon indicating that the event has occurred, a dialog containing the following message is displayed on the display 171 in the form of a pop-up: "The cover is open. Close the cover."

The user can remove the dialog from the display 171 by pressing "Close" in a lower right area of the dialog. Alternatively, the dialog may remain displayed on the display 171 only while the icon is being touched.

Subsequently, in Step S44, the controller 10 determines whether or not the event has been resolved (Step S46). Upon determining that the event has not been resolved (if the result of the determination in Step S46 is No), the controller 10 returns the processing to Step S45.

Upon determining that the event has been resolved (if the result of the determination in Step S46 is Yes), the controller 10 advances to Step S47 and causes the display 171 to remove the notification screen (priority "low") indicating the occurrence of the event (Step S47), and then returns the processing to the determination in Step S41.

As described above, in a case where initial setup and initial operations are carried out simultaneously, the controller 10 causes, upon determining that a predetermined event to be an issue that interrupts a predetermined initial operation has occurred, the display 171 to display a screen or an icon indicating the occurrence of the event based on the screen display priority. Thus, it is possible to achieve a digital multifunctional peripheral 1 that prevents the initial operations from taking longer than necessary even if a certain initial operation is temporarily interrupted.

Preferred embodiments of the present disclosure include any combination of the plurality of embodiments described above.

In addition to the embodiments described above, the present disclosure may include various modifications thereof. Such modifications should not be construed as falling outside the scope of the present disclosure. The present disclosure includes all variations that are equivalent in meaning and scope to the claims.

What is claimed is:

1. An image forming apparatus comprising:

a main body including an image former;

a display that displays various setting screens;

an operation acceptor that receives an operation from a user;

a storage that stores therein values set by the user in initial setup and a sequence of processing related to predetermined initial operations; and one or more controllers that control the image former, the display, the operation acceptor, and the storage, wherein in a case where the initial operations are carried out in parallel with the initial setup while the display is displaying a screen for the initial setup, the controllers cause, upon determining that an issue that interrupts a predetermined initial operation among the initial operations has occurred, the display to display a screen indicating the issue that interrupts the predetermined initial operation with priority over the screen for the initial setup.

2. The image forming apparatus according to claim 1, wherein the controllers cause the display to display the screen for the initial setup with priority, provided that the predetermined initial operation has been completed.

3. The image forming apparatus according to claim 1, wherein in a case where a restart of the image forming apparatus is required after completion of the initial setup, the controllers put the restart on hold until the predetermined initial operation is completed if the predetermined initial operation has not been completed.

4. The image forming apparatus according to claim 1, wherein the predetermined initial operation is a predetermined image formation-related operation including toner replenishment and image quality adjustment.

5. The image forming apparatus according to claim 1, wherein the main body includes a toner cartridge mount in which a toner cartridge is mounted and a toner cartridge mounting detector that detects mounting of the toner cartridge, and the issue that interrupts the predetermined initial operation includes the toner cartridge being yet to be mounted.

6. The image forming apparatus according to claim 1, wherein the main body includes a door provided at a predetermined position and a door open/close detector that detects whether the door is open or closed, and the issue that interrupts the predetermined initial operation includes the door being open.

7. The image forming apparatus according to claim 1, wherein the main body includes an error detector that detects a predetermined error, and the issue that interrupts the predetermined initial operation includes the predetermined error being detected.

* * * * *